(12) United States Patent
Snow et al.

(10) Patent No.: US 12,101,832 B2
(45) Date of Patent: Sep. 24, 2024

(54) CONNECTIVITY SESSION BETWEEN DEVICES BASED ON A CONNECTIVITY TRIGGER

(71) Applicant: Motorola Mobility LLC, Chicago, IL (US)

(72) Inventors: Jeffrey Thomas Snow, Barrington, IL (US); Liang Zhang, Beijing (CN); Amit Kumar Agrawal, Bangalore (IN); Olivier David Meirhaeghe, Lincolnshire, IL (US); Zhiyi Cai, Gaoxin District (CN)

(73) Assignee: Motorola Mobility LLC, Chicago, IL (US)

( * ) Notice: Subject to any disclaimer, the term of this patent is extended or adjusted under 35 U.S.C. 154(b) by 321 days.

(21) Appl. No.: 17/473,312

(22) Filed: Sep. 13, 2021

(65) Prior Publication Data
US 2023/0063665 A1    Mar. 2, 2023

(30) Foreign Application Priority Data

Sep. 1, 2021    (CN) .......................... 202111020526.2

(51) Int. Cl.
*H04W 76/14*    (2018.01)
*H04W 76/15*    (2018.01)
(Continued)

(52) U.S. Cl.
CPC .......... *H04W 76/14* (2018.02); *H04W 76/15* (2018.02); *H04W 76/38* (2018.02); *H04W 88/04* (2013.01)

(58) Field of Classification Search
CPC ..... H04W 76/14; H04W 76/15; H04W 76/38; H04W 88/04; H04W 36/365;
(Continued)

(56) References Cited

U.S. PATENT DOCUMENTS 7,020,460 B1    3/2006    Sherman et al.
8,923,824 B1    12/2014    Masterman
(Continued)

FOREIGN PATENT DOCUMENTS

CN    110234025 A    9/2019
WO    2006108288 A1    10/2006

OTHER PUBLICATIONS

"Auto Hotspot, How to | Samsung Galaxy S10 Plus", YouTube Video uploaded by Omarr Ghafoor [online][retrieved Jun. 23, 2021]. Retrieved from the Internet <https://www.youtube.com/watch?v=2V6s31zA7p4>., Oct. 30, 2019, 4 Pages.
(Continued)

*Primary Examiner* — Rushil P. Sampat
(74) *Attorney, Agent, or Firm* — FIG. 1 Patents (57) ABSTRACT

Techniques for connectivity session between devices based on a connectivity trigger are described and may be implemented to enable a first device (e.g., a mobile device) to provide network connectivity for a second device. Generally, the described implementations enable multiple different connectivity triggers to be utilized to trigger a connectivity session between devices, such as for enabling network connectivity of a first device to be provided to a second device.

20 Claims, 8 Drawing Sheets

(51) Int. Cl.
*H04W 76/38* (2018.01)
*H04W 88/04* (2009.01)
(58) Field of Classification Search
CPC ........... H04W 36/14; H04W 36/00837; H04W 48/18; H04W 88/06; H04W 36/0085; H04W 36/26; H04W 36/30; H04W 84/12
See application file for complete search history.

(56) References Cited

U.S. PATENT DOCUMENTS

| | | | |
|---|---|---|---|
| 9,402,167 | B2 | 7/2016 | Barat et al. |
| 9,491,374 | B1 | 11/2016 | Avrahami et al. |
| 9,686,088 | B2 | 6/2017 | Papakipos et al. |
| 9,801,158 | B1 | 10/2017 | Yuan et al. |
| 10,531,039 | B1 | 1/2020 | Bender et al. |
| 10,554,921 | B1 | 2/2020 | Lim et al. |
| 11,231,844 | B2 | 1/2022 | Steeves |
| 11,368,579 | B1 | 6/2022 | Palanivel |
| 11,410,778 | B2 | 8/2022 | Ravindranathan et al. |
| 11,641,440 | B2 | 5/2023 | Agrawal et al. |
| 11,902,936 | B2 | 2/2024 | Desai et al. |
| 2003/0061611 | A1 | 3/2003 | Pendakur |
| 2008/0177844 | A1 | 7/2008 | McCarthy et al. |
| 2012/0289203 | A1 | 11/2012 | Santo et al. |
| 2013/0100017 | A1 | 4/2013 | Papakipos et al. |
| 2014/0192137 | A1 | 7/2014 | Kim et al. |
| 2014/0280578 | A1 | 9/2014 | Barat et al. |
| 2015/0110255 | A1 | 4/2015 | Williams et al. |
| 2015/0237598 | A1 | 8/2015 | Yoshitomi et al. |
| 2015/0365820 | A1* | 12/2015 | White ................... H04W 76/12 455/419 |
| 2016/0227278 | A1 | 8/2016 | Bugajski et al. |
| 2016/0285974 | A1 | 9/2016 | Shurtleff et al. |
| 2017/0353569 | A1 | 12/2017 | Kozma et al. |
| 2019/0132903 | A1 | 5/2019 | Suxena |
| 2019/0191214 | A1 | 6/2019 | Mandavilli et al. |
| 2020/0099545 | A1 | 3/2020 | Hong et al. |
| 2020/0167699 | A1 | 5/2020 | Cohen |
| 2021/0084556 | A1* | 3/2021 | Gunnalan ............... H04L 45/22 |
| 2021/0211902 | A1* | 7/2021 | Achyuth ............... H04W 24/04 |
| 2021/0274416 | A1* | 9/2021 | Jendli ................... H04W 88/06 |
| 2022/0070371 | A1 | 3/2022 | Bushman et al. |
| 2022/0070389 | A1 | 3/2022 | Tangeland et al. |
| 2022/0239785 | A1* | 7/2022 | Daniel Marcelino Barbeira ........ H04W 12/72 |
| 2023/0067649 | A1 | 3/2023 | Desai et al. |
| 2023/0085250 | A1 | 3/2023 | Agrawal et al. |
| 2023/0319574 | A1 | 10/2023 | Agrawal et al. |
| 2024/0114482 | A1 | 4/2024 | Desai et al. |

OTHER PUBLICATIONS

"Check your phone's notifications in Samsung DeX", Samsung Electronics America, Inc. [retrieved Jul. 16, 2021]. Retrieved from the Internet <https://www.samsung.com/us/support/answer/ANS00062702/>., 2019, 3 Pages.
"Do you know about Auto Hotspot?", Samsung [retrieved Jun. 23, 2021]. Retrieved from the Internet <https://r2.community.samsung.com/t5/Tech-Talk/Do-you-know-about-Auto-Hotspot/td-p/2967111>., Dec. 4, 2019, 5 Pages.
"How do you automatically activate Mobile hotspot via Bluetooth connection on Windows 10 Mobile?", in: Windows Central Forums [online][retrieved Jul. 12, 2021]. Retrieved from the Internet <https://forums.windowscentral.com/ask-question/452584-how-do-you-automatically-activate-mobile-hotspot-via-bluetooth-connection-windows-10-mobile.html>., Feb. 19, 2017, 11 Pages.
"Instant Hotspot on your Mac", Apple Inc. [retrieved Jun. 23, 2021]. Retrieved from the Internet <https://support.apple.com/guide/macbook-air/instant-hotspot-apdae69c81f1/mac>., Feb. 2019, 2 Pages.
"Setting up Auto Hotspot on my Samsung phone", Samsung [retrieved Jun. 23, 2021]. Retrieved from the Internet <https://www.samsung.com/au/support/mobile-devices/setup-auto-hotspot/>., Oct. 20, 2020, 8 Pages.
Pratik , "How to Use Your Phone as a Drawing Pad for PC", TechWiser Blog [online][retrieved Jun. 8, 2021]. Retrieved from the Internet <https://techwiser.com/use-phone-as-drawing-pad-for-pc/>., Jul. 15, 2020, 12 pages.
Bohn, Dieter , "Chromebook Instant Tethering expands beyond Google devices and phones", The Verge Blog, Vox Media, LLC. [online][retrieved Jun. 23, 2021]. Retrieved from the Internet <https://www.theverge.com/2019/2/4/18210378/chromebook-instant-tethering-android-mobile-hotspot-chrome-os-expansion>., Feb. 4, 2019, 6 Pages.
Cipriani, Jason , "How to use Apple's Instant Hotspot feature", CNET [online][retrieved Jun. 23, 2021]. Retrieved from the Internet <https://www.cnet.com/how-to/how-to-use-apples-instant-hotspot-feature/>., Feb. 7, 2019, 4 Pages.
Heinisch, Christian , "HotSpot Automatic (free)", Google Play [retrieved Jul. 12, 2021]. Retrieved from the Internet <https://play.google.com/store/apps/details?id=de.christian_heinisch.hotspot.enablehotspot&hl=en_US&gl=US>., Jun. 7, 2018, 3 Pages.
Russell, Brandon , "Galaxy S21 features wireless support for Samsung DeX on PC", XDA Developers Blog [online][retrieved Jun. 8, 2021]. Retrieved from the Internet <https://www.xda-developers.com/galaxy-s21-wireless-support-samsung-dex-on-pc/>., Feb. 5, 2021, 7 pages.
U.S. Appl. No. 17/462,281 , "Non-Final Office Action", U.S. Appl. No. 17/462,281, Apr. 26, 2023, 13 pages.
U.S. Appl. No. 17/473,384, "Notice of Allowance", U.S. Appl. No. 17/473,384, Feb. 24, 2023, 8 pages.
U.S. Appl. No. 17/473,384, "Supplemental Notice of Allowability", U.S. Appl. No. 17/473,384, Mar. 31, 2023, 2 pages.
U.S. Appl. No. 17/473,384 , "Non-Final Office Action", U.S. Appl. No. 17/473,384, Oct. 6, 2022, 14 pages.
U.S. Appl. No. 17/462,281 , "Notice of Allowability", U.S. Appl. No. 17/462,281, Oct. 12, 2023, 3 pages.
U.S. Appl. No. 17/462,281 , "Notice of Allowance", U.S. Appl. No. 17/462,281, Sep. 14, 2023, 12 pages.

* cited by examiner

CONNECTIVITY SESSION BETWEEN DEVICES BASED ON A CONNECTIVITY TRIGGER

BACKGROUND

Today's person is afforded a tremendous selection of devices that are capable of performing a multitude of tasks. For instance, desktop and laptop computers provide computing power and screen space for productivity and entertainment tasks. Further, smartphones and tablets provide computing power and communication capabilities in highly portable form factors. Many people have access to multiple different devices and use of a particular device depends on the person's current status, such as on the go, in the office, at home, and so forth. While individual instances of devices provide functionality for discrete sets of tasks, the ability for devices to intercommunicate with one another greatly expands available task options and operating environments. For instance, a typical smartphone is able to wirelessly cast visual content to a larger screen device to enable enhanced enjoyment of the content.

In the context of providing network connectivity between devices, however, current techniques for device intercommunication are limited. For instance, a particular mobile device such as a smartphone can serve as a wireless connectivity point (e.g., a wireless hotspot) to provide network access to a different device. Conventional techniques for utilizing a mobile device as a network connectivity point for other devices, however, are complicated and typically require extensive user interaction to set up the connectivity. Accordingly, some users may forego such functionality and/or may fail to successfully establish such connectivity, such as based on incorrectly entered information as part of establishing such connectivity.

BRIEF DESCRIPTION OF THE DRAWINGS

Aspects of connectivity session between devices based on a connectivity trigger are described with reference to the following Figures. The same numbers may be used throughout to reference similar features and components that are shown in the Figures.

DETAILED DESCRIPTION

Techniques for connectivity session between devices based on a connectivity trigger are described and may be implemented to enable a first device (e.g., a mobile device) to provide network connectivity for a second device. Generally, the described implementations enable multiple different connectivity triggers to be utilized to trigger a connectivity session between devices, which provides for greater automation and user convenience than is provided by traditional techniques for inter-device communication.

According to various implementations, the described techniques use various connectivity triggers to establish a connectivity session between devices. For instance, consider a scenario where a mobile device (e.g., a smartphone) is in physical proximity to a computing device, e.g., a laptop computer, a desktop computer, etc. The mobile device and the computing device, for example, are able to intercommunicate, such as via wireless and/or wired connectivity. While the mobile device and the computing device are in physical proximity, a connectivity trigger occurs on the computing device indicating that a connectivity session is to be established between the mobile device and the computing device. The connectivity trigger, for instance, represents an indication of a network status of the computing device, such as unavailability of network connectivity, availability of a poor quality and/or unsecure network, motion of the computing device such that network connectivity is likely unavailable and/or unstable, and so forth.

Accordingly, in response to the connectivity trigger, a connectivity session is established between the mobile device and the computing device. The mobile device and the computing device, for example, negotiate a wireless and/or wired communication channel between the devices. Network connectivity that is available to the mobile device is shared with the computing device over the communication channel. In at least one implementation, the connectivity session is established automatically and in response to the trigger event, e.g., independent of user interaction to initiate establishing the connectivity session. Generally, the mobile device and the wireless device are able to establish inter-connectivity for the connectivity session in various ways, such as direct wireless connectivity and/or wired connectivity. Thus, the computing device is provided with network connectivity via the mobile device, such as in a scenario where the computing device cannot directly connect to a network.

Accordingly, the techniques described herein provide seamless interfacing between devices for connectivity sessions. For instance, in response to various connectivity trigger events, connectivity sessions are established between devices to enable network connectivity of one device to be utilized by a second device.

While features and concepts of connectivity session between devices based on a connectivity trigger can be implemented in any number of environments and/or configurations, aspects of connectivity session between devices based on a connectivity trigger are described in the context of the following example systems, devices, and methods.

Figure 1:
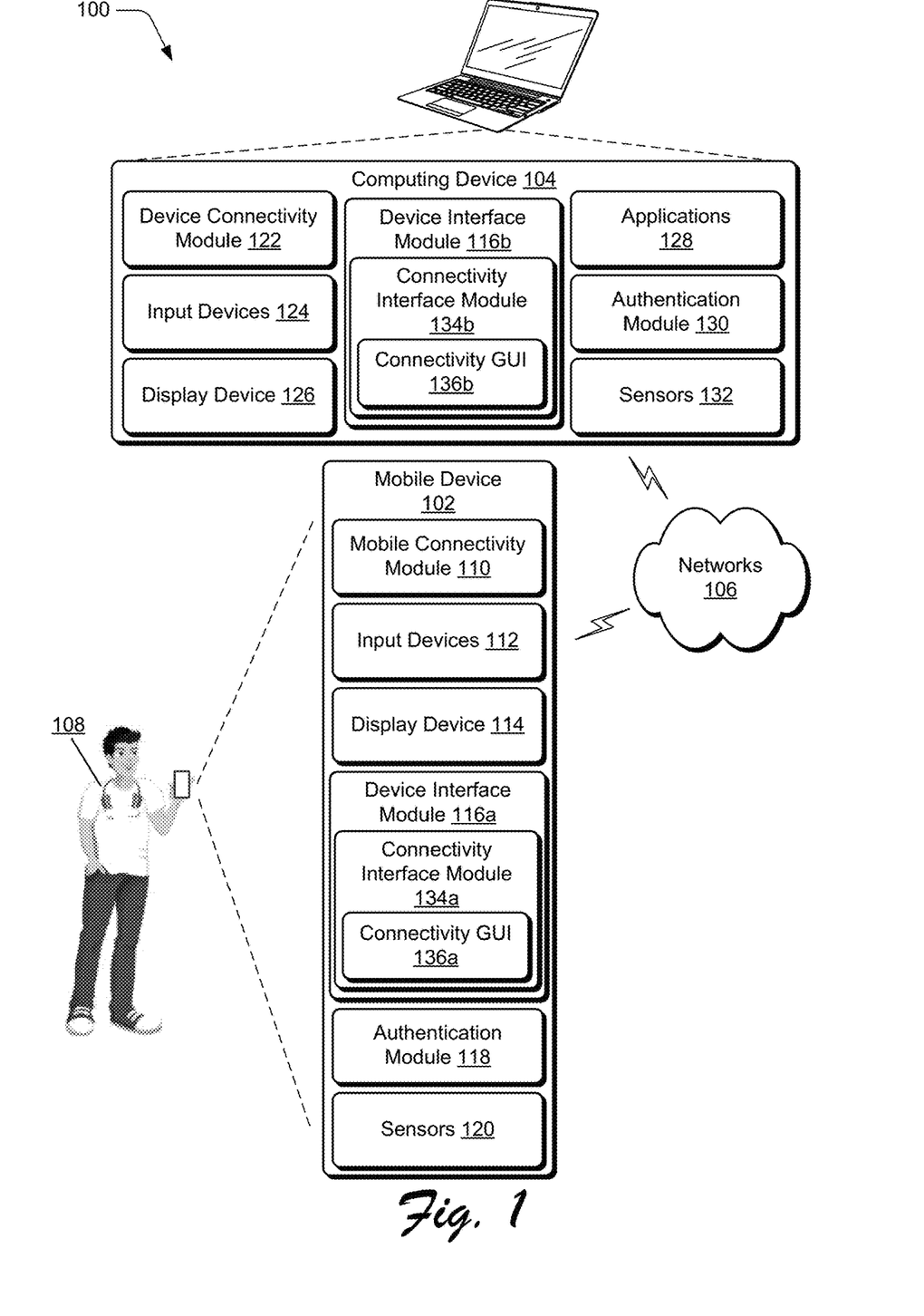
FIG. 1 illustrates an example environment in which aspects of connectivity session between devices based on a connectivity trigger can be implemented.

FIG. 1 illustrates an example environment 100 in which aspects of connectivity session between devices based on a connectivity trigger can be implemented. The environment 100 includes a mobile device 102 and a computing device 104 that are interconnectable via a network 106 and/or set of networks 106. In this particular example, the mobile device 102 represents a portable device that can be carried by a user 108, such as a smartphone or a tablet device. Further, the computing device 104 represents a device such as a laptop computer, a desktop computer, and so forth. These examples are not to be construed as limiting, however, and the mobile device 102 and/or the computing device 104 can be implemented in a variety of different ways and form factors. Example attributes of the mobile device 102 and the computing device 104 are discussed below with reference to the device 800 of FIG. 8.

The mobile device 102 includes various functionality that enables the mobile device 102 to perform different aspects of connectivity session between devices based on a connectivity trigger discussed herein, including a mobile connectivity module 110, input devices 112, a display device 114, and a device interface module 116a. The mobile connectivity module 110 represents functionality (e.g., logic and hardware) for enabling the mobile device 102 to interconnect with other devices and/or networks, such as the computing device 104 and the network 106. The mobile connectivity module 110, for instance, enables wireless and/or wired connectivity of the mobile device 102.

The input devices 112 represent functionality for enabling input to the mobile device 102, such as user input to invoke functionality of the mobile device 102. The input devices 112 can be implemented in various ways, such as touch input, audible input (e.g., speech), a physical keyboard, and so forth.

The device interface module 116a represents functionality for enabling the mobile device 102 to interface with other devices. As further detail below, for instance, the device interface module 116a enables the mobile device 102 to establish wireless and/or wired data communication with other devices, e.g., the computing device 104.

The mobile device 102 also includes an authentication module 118 and sensors 120. The authentication module 118 represents functionality to enable authentication of the mobile device 102 for various purposes as well as authentication of other devices (e.g., the computing device 104) to interact with the mobile device in various ways. The sensors 120 are representative of functionality to detect various physical and/or logical phenomena in relation to the mobile device 102, such as motion, light, image detection and recognition, time and date, position, location, touch detection, temperature, and so forth. Examples of the sensors 120 include hardware and/or logical sensors such as an accelerometer, a gyroscope, a camera, a microphone, a clock, biometric sensors, touch input sensors, position sensors, environmental sensors (e.g., for temperature, pressure, humidity, and so on), geographical location information sensors (e.g., Global Positioning System (GPS) functionality), and so forth.

The computing device 104 includes various functionality that enables the computing device 104 to perform different aspects of connectivity session between devices based on a connectivity trigger discussed herein, including a device connectivity module 122, input devices 124, a display device 126, applications 128, and a device interface module 116b. The device connectivity module 122 represents functionality (e.g., logic and hardware) for enabling the computing device 104 to interconnect with other devices and/or networks, such as the mobile device 102 and the network 106. The device connectivity module 122, for instance, enables wireless and/or wired connectivity of the computing device 104. Generally, the computing device 104 and the mobile device 102 are configured to intercommunicate via a variety of different wireless protocols, such as wireless cellular (e.g., 3G, 4G, 5G), wireless broadband, Wireless Local Area Network (WLAN) (e.g., Wi-Fi), Wi-Fi Direct, wireless short distance communication (e.g., Bluetooth™ (including Bluetooth™ Low Energy (BLE)), Near Field Communication (NFC)), and so forth.

The input devices 124 represent functionality for enabling input to the computing device 104 and are implementable in different ways such as a keyboard, a mouse, touch input devices, audible input devices, and so forth. The applications 128 represent functionality for performing different computing tasks via the computing device 104, such as productivity tasks (e.g., word processing, content generation, data analysis, etc.), web browsing, communication with other devices, and so forth. The device interface module 116b is representative of functionality for enabling the computing device 104 to interface with other devices. For instance, the device interface module 116b interfaces with the device interface module 116a of the mobile device 102 to enable collaborative data communication between the computing device 104 and the mobile device 102. The computing device 104 also includes an authentication module 130 and sensors 132. The authentication module 130 represents functionality to enable authentication of the computing device 104 for various purposes as well as authentication of other devices (e.g., the mobile device 102) to interact with the computing device 104 in various ways. The sensors 132 are representative of functionality to detect various physical and/or logical phenomena in relation to the computing device 104, such as motion, light, image detection and recognition, time and date, position, location, touch detection, temperature, and so forth. Examples of the sensors 132 include hardware and/or logical sensors such as an accelerometer, a gyroscope, a camera, a microphone, a clock, biometric sensors, touch input sensors, position sensors, environmental sensors (e.g., for temperature, pressure, humidity, and so on), geographical location information sensors (e.g., Global Positioning System (GPS) functionality), and so forth.

According to implementations for connectivity session between devices based on a connectivity trigger, for example, the device interface module 116a includes connectivity interface module 134a that interfaces with a connectivity interface module 134b of the device interface module 116b to enable the mobile device 102 to provide network connectivity (e.g., wireless and/or wired connectivity) to the computing device 104. For instance, and as detailed below, network connectivity available to the mobile device 102 is shared with computing device 104 to provide the computing device 104 with network access. The connectivity interface module 134a, for example, exposes a connectivity graphical user interface (GUI) 136a that is displayed on the display device 114 and that enables various network connectivity attributes to be configured. Alternatively or additionally, the connectivity interface module 134b of the computing device 104 exposes a connectivity graphical user interface (GUI) 136b that is displayed on the display device 126 and that enables various network connectivity attributes to be configured.

Having discussed an example environment in which the disclosed techniques can be performed, consider now some example scenarios and implementation details for implementing the disclosed techniques.

Figure 2:
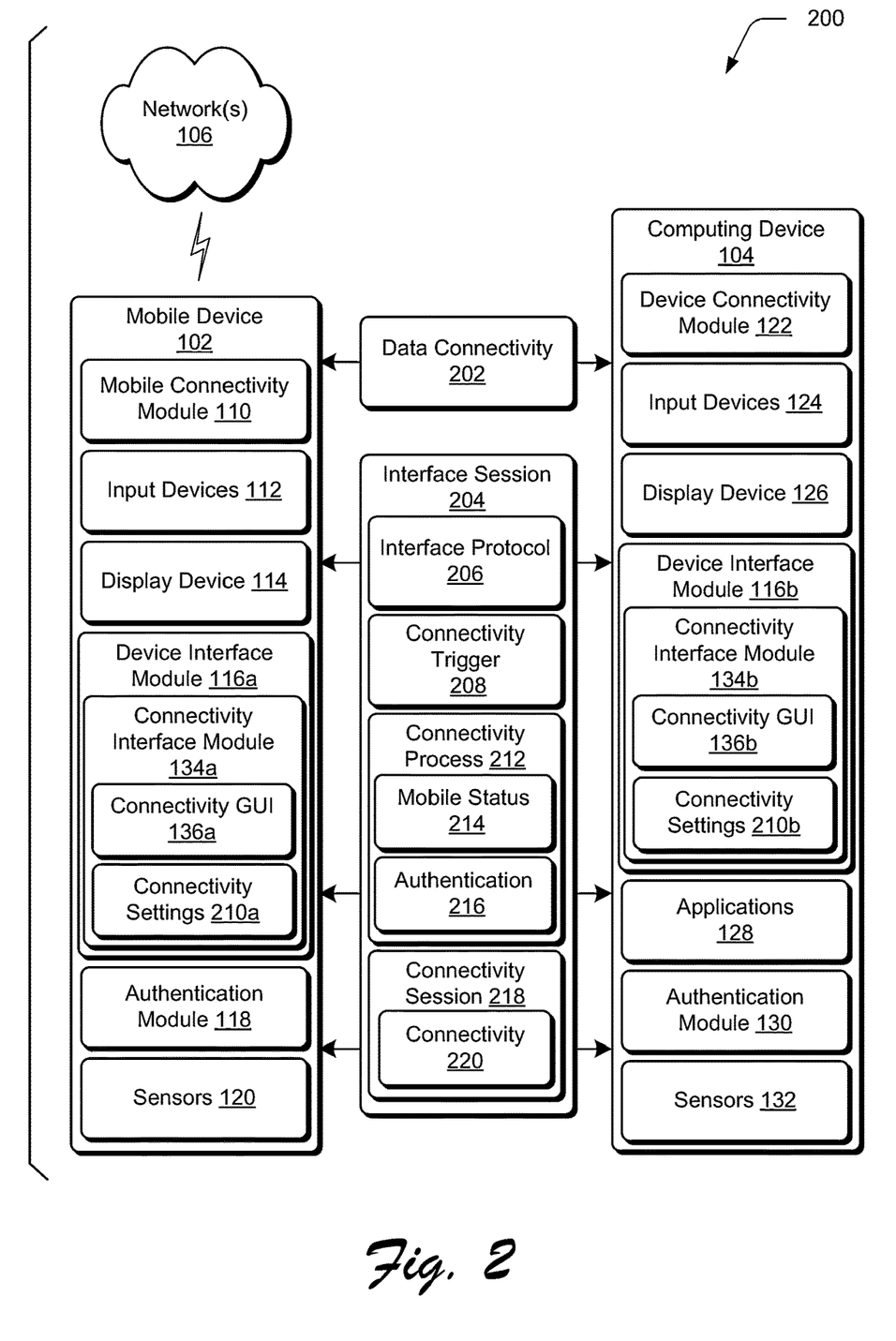
FIG. 2 depicts an example system for establishing network connectivity between devices based on a connectivity trigger in accordance with one or more implementations.

FIG. 2 depicts an example system 200 for establishing network connectivity between devices based on a connectivity trigger in accordance with one or more implementations. Generally, the system 200 can be implemented in the environment 100 and incorporates attributes of the environment 100 introduced above.

In the system 200 the mobile connectivity module 110 and the device connectivity module 122 interface to establish data connectivity 202 between the mobile device 102 and the computing device 104. Generally, the data connectivity 202 is implemented via wireless and/or wired connectivity between the mobile device 102 and the computing device 104 for exchanging data between the devices. The data connectivity 202, for instance, is implemented via direct wireless and/or wired connectivity between the mobile device 102 and the computing device 104. In a wireless scenario the data connectivity 202 can be established as direct device-to-device connectivity between the mobile device 102 and the computing device 104 and utilizing any suitable wireless protocol, such as Wi-Fi Direct, Bluetooth™ (including Bluetooth™ Low Energy (BLE), ultra-wideband (UWB), Near Field Communication (NFC)), LTE direct, NR sidelink, and so forth.

Utilizing the data connectivity 202 the device interface module 116a of the mobile device 102 and the device interface module 116b of the computing device 104 intercommunicate to establish an interface session 204. Generally, the interface session 204 represents an exchange of data between the device interface modules 116a, 116b and is implemented according to an interface protocol 206. The interface protocol 206, for example, specifies a form in which data is to be communicated as part of the interface session 204.

In conjunction with (e.g., concurrently and/or after) establishing the interface session 204 a connectivity trigger 208 occurs indicating that the mobile device 102 is to provide network connectivity for the computing device 104. Generally, the connectivity trigger 208 occurs in response to detecting a particular device state condition and/or set of device state conditions for the computing device 104. Examples of the connectivity trigger 208 include:

No available wireless connectivity trigger—no available wireless connectivity is detected for the computing device 104, e.g., no available WiFi network and/or other wireless network. For instance, as part of the interface session 204, the connectivity interface module 134a interfaces with the connectivity interface module 134b to determine that the computing device 104 does not have access to a wireless network. The connectivity interface module 134b, for example, queries the device connectivity module 122 for a wireless and/or network status of the computing device 104, and the device connectivity module 122 notifies the connectivity interface module 134b that wireless network connectivity is not currently available to the computing device 104.

Unstable wireless connectivity trigger—wireless connectivity is available to the computing device 104 but is unstable. For instance, as part of the interface session 204, the connectivity interface module 134a interfaces with the connectivity interface module 134b to determine that network connectivity available for the computing device 104 is unstable, e.g., is intermittent and/or exhibits poor signal strength and/or poor signal quality. For example, a threshold signal strength and/or signal quality is defined, and the available network connectivity is below the threshold signal strength/signal quality. The connectivity interface module 134b, for example, queries the device connectivity module 122 for a wireless and/or network status of the computing device 104, and the device connectivity module 122 notifies the connectivity interface module 134b that wireless network connectivity available to the computing device 104 is unstable.

Unsecure wireless connectivity trigger—wireless connectivity is available to the computing device 104 but is unsecure. For instance, as part of the interface session 204, the connectivity interface module 134a interfaces with the connectivity interface module 134b to determine that network connectivity available for the computing device 104 is unsecure, e.g., is provided by an untrusted network and/or is in an untrusted physical location. The connectivity interface module 134b, for example, queries the device connectivity module 122 for a wireless and/or network status of the computing device 104, and the device connectivity module 122 notifies the connectivity interface module 134b that wireless network connectivity available to the computing device 104 is unsecure. Alternatively or additionally connectivity settings 210a maintained by the connectivity interface module 134a and/or connectivity settings 210b maintained by the connectivity interface module 134b include a list of allowed wireless networks and/or disallowed wireless networks for the computing device 104. Accordingly, a currently available wireless network is not identified by the connectivity settings 210 as an allowed wireless network and/or is identified as a disallowed wireless network.

Device motion trigger—the computing device 104 is detected to be in motion, e.g., moving between locations. The connectivity interface module 134b, for instance, obtains sensor data from the sensors 132 indicating that the computing device 104 is in motion, e.g., is traveling above a predefined threshold speed and/or has moved more than a predefined threshold distance over a specified period of time. In at least one implementation, the predefined threshold speed and/or the predefined threshold distance of a period of time represent instances of the connectivity settings 210a and/or connectivity settings 210b. Alternatively or additionally to utilizing sensor data from the sensors 132, the connectivity interface module 134a of the mobile device 102 obtains sensor data from the sensors 120 indicating that the mobile device 102 is in motion, e.g., is traveling above the predefined threshold speed and/or has moved more than the predefined threshold distance over the specified period of time. For instance, since the mobile device 102 and the computing device 104 are connected via the interface session 204, motion of the mobile device 102 indicates corresponding motion of the computing device 104.

Application launch trigger—an application is launched on the computing device 104 that utilizes data available from a network. For instance, a particular application 128 is executed (e.g., launched, started) on the computing device 104 and the application 128 utilizes data available over the network 106. Examples of such an application include a web browser, an email client, a cloud-based application, and/or any other application that operates using data retrieved over a network. The connectivity interface module 134b, for instance, detects that the application is launched on the computing device 104 and initiates the connectivity trigger 208 based on the application launch. Generally, the application launch trigger is implemented in various ways, such as based on the application being identified in the connectivity settings 210a and/or connectivity settings 210b and/or an indication that the application requests data from a network source.

These examples of connectivity triggers 208 are presented for purpose of example only, and a variety of other trigger events for a connectivity trigger 208 can be utilized in accordance with various implementations.

Accordingly, in response to detecting the connectivity trigger 208, a connectivity process 212 is initiated to provide network connectivity to the computing device 104. As part of the connectivity process 212 a mobile status 214 is determined and authentication 216 is performed. The mobile status 214, for instance, is implemented to determine a network connectivity status of the mobile device 102, e.g., whether wireless network connectivity of the mobile device 102 meets a threshold signal condition. For example, the threshold signal condition represents a minimum signal strength and/or signal quality. In at least one implementation, wireless connectivity for the mobile device 102 represents wireless cellular data connectivity to a wireless cellular network. The connectivity interface module 134a, for example, queries the mobile connectivity module 110 to determine network signal conditions for the mobile device 102, e.g., signal strength and/or signal quality. Generally, if network connectivity of the mobile device 102 does not meet the threshold signal condition the connectivity process 212 is terminated. In the system 200 the mobile status 214 indicates that the mobile device 102 meets a threshold signal condition and thus the connectivity process 212 continues. For instance, the authentication 216 is performed to permit the computing device 104 to interact with the mobile device 102 for network connectivity.

As part of the authentication 216, for example, authentication data is exchanged between the computing device 104 and the mobile device 102. Generally, authentication data can take various forms, such as a service set identifier (SSID) for the mobile device 102, a password, a personal identification number (PIN), and so forth. In at least one implementation, the authentication 216 includes authenticating the computing device 104 for network access with a network provider (e.g., a mobile carrier service) that provides network connectivity to the mobile device 102. The authentication 216 can be performed using any suitable protocol, such as utilizing transport layer security (TLS) protocols. In at least one implementation, the authentication 216 includes exchanging certificates (e.g., TLS certificates) between a network server and the computing device 104 to check that the network server is secure (e.g., has a valid certificate) and that the computing device 104 is secure, e.g., has a valid certificate. For instance, a session key (e.g., encryption key) is generated and a hash of the network server certificate is encrypted with the session key. The encrypted hash is sent to the computing device 104 and the computing device 104 decrypts the hash (e.g., using the session key and/or its own decryption key) to check the validity of the network server's certificate. Generally, this ensures secure network communication over the mobile device 102 between the network server and the computing device 104.

Accordingly, in response to successful authentication 216, a connectivity session 218 is established between the mobile device 102 and the computing device 104 that provides network connectivity 220 to the computing device 104 to access the network 106. The mobile device 102, for example, serves as a mobile hotspot for the computing device 104 such that network communications are routed between the computing device 104 and the network 106 via the mobile device 102. In at least one implementation, the mobile device 102 connects to the network 106 via a first radio access technology (e.g., wireless cellular) and provides the network connectivity 220 to the network 106 to the computing device 104 via a different radio access technology, e.g., Wi-Fi Direct, Bluetooth™ (including BLE), UWB, NFC, LTE direct, NR sidelink, and so forth.

In at least one implementation, the connectivity process 212 and the connectivity session 218 are performed automatically and without user interaction, e.g., in response to establishing the interface session 204 and/or detecting the connectivity trigger 208. Alternatively or additionally, a notification can be presented that the connectivity trigger 208 occurs and/or that the connectivity process 212 is implemented. For instance, the connectivity interface module 134a presents a notification via the connectivity GUI 136a on the mobile device 102 that the connectivity session 218 is being established, and/or the connectivity interface module 134b presents a notification via the connectivity GUI 136b on the computing device 104 that the connectivity session 218 is being established. In at least one implementation, the notification provides an option to cancel establishment of the connectivity session 218. An example notification is described below.

In at least one implementation, the interface session 204 and/or the connectivity process 212 are initiated in response to scanning a visual indicator that includes coded data, such as a quick response (QR) code. The device interface module 116b, for instance, generates a QR code that includes instructions to implement the interface session 204 and/or the connectivity process 212 and displays on the QR code on the display device 126. In at least one implementation the QR code includes authentication data that is utilized as part of the authentication 216. Accordingly, the mobile device 102 scans and decodes the QR code to identify data encoded within the QR code. Based on the decoded data the device interface module 116a interacts with the device interface module 116b to initiate the interface session 204, and/or the connectivity interface module 134a interacts with the connectivity interface module 134b to initiate the connectivity process 212. For instance, in at least one scenario scanning the QR code causes the interface session 204 to be established and causes a check for a connectivity trigger 208. If a connectivity trigger 208 is detected, the connectivity process 212 is initiated to establish the connectivity session 218.

Figure 3:
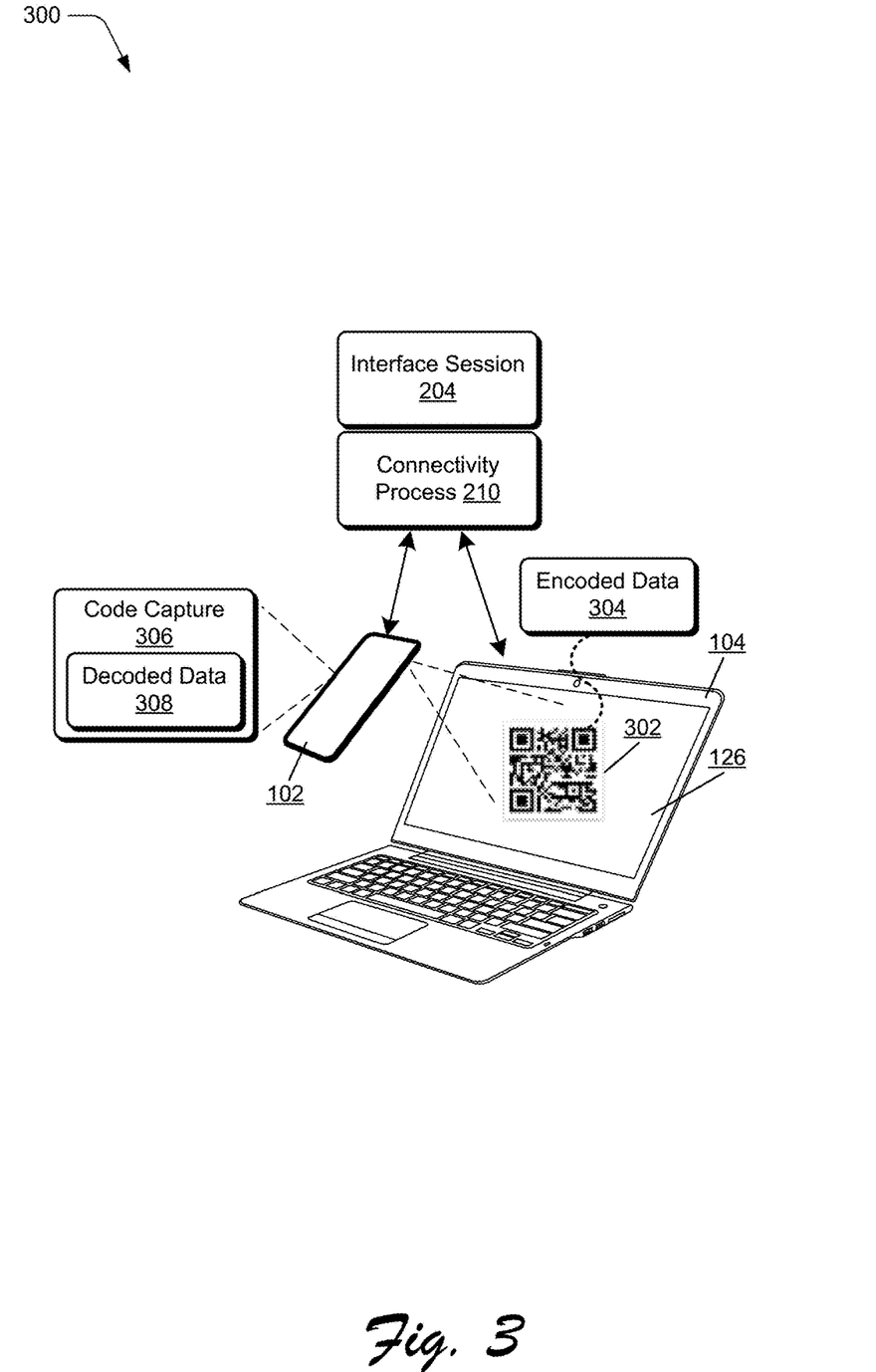
FIG. 3 depicts a scenario for utilizing visually-represented encoded data as part of establishing network connectivity in accordance with one or more implementations.

FIG. 3 depicts a scenario 300 for utilizing visually-represented encoded data as part of establishing network connectivity in accordance with one or more implementations. In the scenario 300 visual indicator 302 including encoded data is displayed on the display device 126 of the computing device 104. In this particular example the visual indicator 302 is implemented as a QR code. However, any suitable representation of encoded data can be utilized. In at least one implementation, the device interface module 116b and/or the connectivity interface module 134b generates the visual indicator 302 and causes the visual indicator 302 to be displayed. Generally, the visual indicator 302 includes various encoded data 304 such as an instruction to initiate an interface session 204, an instruction to initiate a connectivity process 212, an instruction to determine a network status of the computing device 104, authentication data for use as part of an authentication 216 (e.g., an SSID, password, PIN, digital certificate information, a session key, etc.), and so forth.

Further to the scenario 300, the mobile device 102 scans the visual indicator 302 to perform a code capture 306 that captures visual attributes of the visual indicator 302 and extracts decoded data 308 from the visual indicator 302. The decoded data 308, for example, represents decoded versions of the encoded data 304. Accordingly, based on the decoded data 308, the interface session 204 and/or the connectivity process 212 are initiated and implemented, such as described above. In at least one implementation, the code capture 306 is implemented based on user manipulation of the mobile device 102 to capture the visual indicator 302, and the interface session 204 and/or the connectivity process 212 are initiated automatically and in response to the code capture 306, e.g., without further user interaction subsequent to capturing visual attributes of the visual indicator 302.

While the scenario 300 is depicted with reference to visually encoded data 304, various other forms of generating and exposing the encoded data 304 can be utilized, such as encoded data embedded in sound waves and/or light waves (e.g., infrared and/or other light wavelength(s)).

Figure 4:
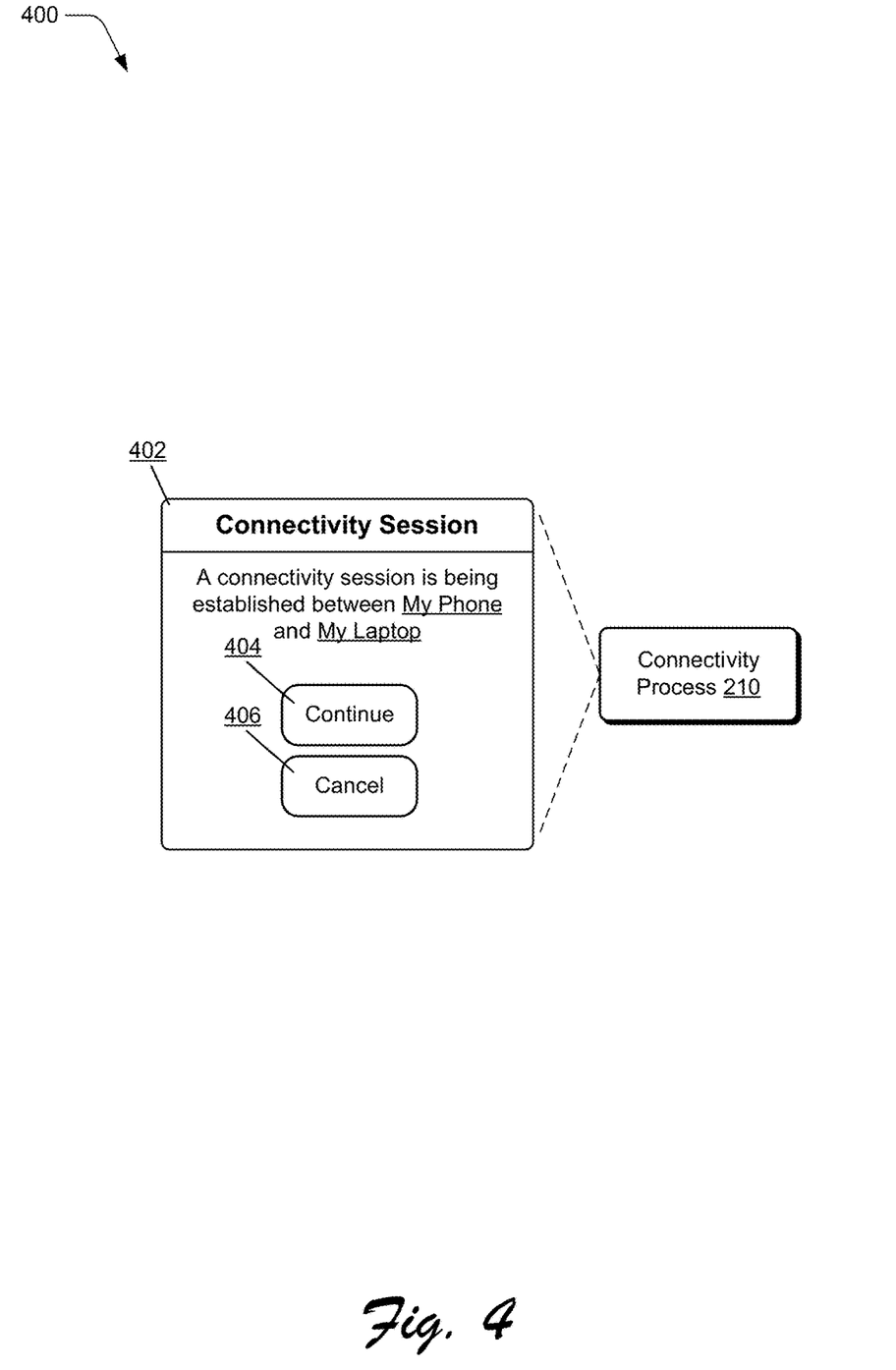
FIG. 4 depicts a scenario for a user prompt in conjunction with establishing a connectivity session in accordance with one or more implementations.

FIG. 4 depicts a scenario 400 for a user prompt in conjunction with establishing a connectivity session in accordance with one or more implementations. The scenario 400, for example, is implemented in response to a connectivity trigger 208 and in conjunction with initiating a connectivity process 212 such as described above with reference to the system 200. The scenario 400 illustrates a user prompt 402 which represents a visual prompt that a connectivity process 212 is initiated, e.g., in response to a connectivity trigger 208. The user prompt 402, for instance, is presented via the connectivity GUI 136a on the mobile device 102 and/or the connectivity GUI 136b on the computing device 104.

The user prompt 402 notifies a user that a connectivity session is being established and identifies devices involved in the connectivity session, e.g., the mobile device 102 and the computing device 104. Further, the user prompt 402 includes a continue control 404 and a cancel control 406. The continue control 404, for instance, is selectable to cause establishment of the connectivity session to continue. For example, selecting the continue control 404 causes the user prompt 402 to be removed from display and establishment of the connectivity session between the identified devices to continue. In at least one implementation, in conjunction with establishing the connectivity session, the user prompt 402 is presented for a specified period of time, e.g., n seconds. After this period of time, the user prompt 402 is removed and the establishment of the connectivity session continues. Accordingly, the continue control 404 is selectable before this period of time elapses to cause the user prompt 402 to be removed prior to expiry of the period of time and a transition to the connectivity session to proceed.

The cancel control 406 is selectable to cancel establishment of the connectivity session. For instance, when a connectivity trigger 208 occurs and the user prompt 402 is presented, a user is able to select the cancel control 406 to stop establishment of a connectivity session 218. As mentioned above the user prompt 402 is presentable for a specified period of time before establishing a connectivity session. Thus, the cancel control 406 is selectable during this period of time to cancel establishment of a connectivity session and if the cancel control 406 is not selected during the time that the user prompt 402 is presented, the user prompt 402 is removed and establishment of a connectivity session proceeds.

Figure 5:
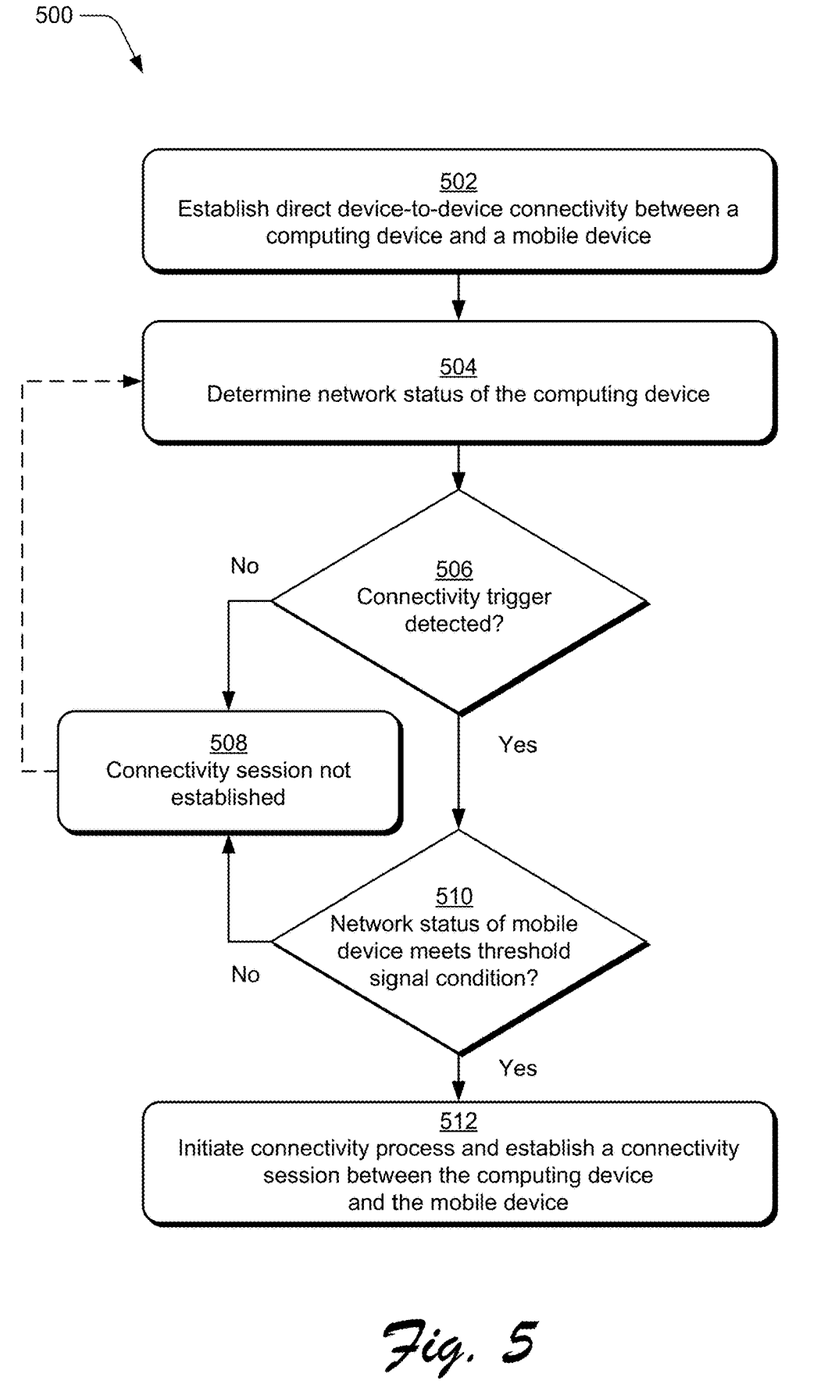
FIG. 5 illustrates an example method for implementing network connectivity for a computing device in accordance with one or more implementations.

FIG. 5 illustrates an example method 500 for implementing network connectivity for a computing device in accordance with one or more implementations. At 502 direct device-to-device connectivity is established between a computing device and a mobile device. The mobile device 102 and the computing device 104, for instance, interact to establish direct device-to-device connectivity between the devices. The connectivity, for instance, is established via wireless and/or wired connectivity. In a wireless scenario any suitable wireless protocol can be utilized, examples of which are described above. In at least one implementation, a user interacts with the mobile device 102 and/or the computing device 104 to initiate the connectivity, such as to establish an interface session 204. In one particular example the user utilizes the mobile device 102 to capture encoded data presented by the computing device 104 (e.g., the visual indicator 302) and the mobile device 102 decodes the encoded data to identify instructions to implement the direct device-to-device connectivity. The mobile device 102 and/or the computing device 104 then executes the instructions to establish the connectivity. In at least one implementation the connectivity is established via interaction between the device interface modules 116a, 116b.

At 504 a network status of the computing device is determined. The connectivity interface module 134b, for instance, determines whether the computing device 104 has access to a network, e.g., a wireless network. Further, if the computing device 104 does have access to network connectivity, a status of the network connectivity is determined, such as whether the connectivity is stable and/or secure. At 506 a determination is made whether a connectivity trigger is detected based on the network status. Generally, a connectivity trigger represents a device state condition that indicates that a connectivity session is to be established between the computing device 104 and the mobile device 102. The connectivity interface module 134a and/or the connectivity interface module 134b, for instance, determine whether a connectivity trigger 208 is detected based on the network status, such as no available network for the computing device 104, an unstable and/or unsecure network is available, that the computing device 104 is detected to be in motion, and so forth.

If a connectivity trigger is not detected ("No") at 508 a connectivity session is not established. For instance, it is detected that the computing device 104 has access to a network independent of the mobile device 102. Generally, an interface session 204 can continue between the devices but a connectivity session is not established between the devices. In at least one implementation steps 504, 506 are periodically performed to determine network status of the computing device 104, such as to detect a change in network status. For instance, if the computing device 104 has available network connectivity such that a connectivity session is not established but then later loses the network connectivity, this causes a connectivity trigger to be detected.

If a connectivity trigger is detected ("Yes") at 510 a determination is made whether a network status of the mobile device meets a threshold signal condition. The connectivity interface module 134a, for instance, determines whether network connectivity of the mobile device 102 meets a threshold signal condition, such as a minimum signal strength and/or signal quality. In at least one implementation the network status of the mobile device 102 is based on wireless cellular connectivity of the mobile device 102. If the network status of the mobile device does not meet the threshold signal condition ("No"), the method proceeds to 508. The connectivity interface module 134a, for instance, determines that the mobile device 102 does not have available network connectivity or that network connectivity of the mobile device is below the threshold signal condition, e.g., is below a threshold signal strength and/or threshold signal quality.

If the network status of the mobile device meets the threshold signal condition ("Yes"), at 512 a connectivity process is initiated and a connectivity session is established between the computing device and the mobile device. Different aspects of a connectivity process are described above, such as authenticating the computing device 104 for network connectivity via the mobile device 102. Accordingly, network access is provided to the computing device 104 via the mobile device 102, e.g., automatically and in response to the connectivity process.

In at least one implementation step 510 is performed periodically to determine whether network status of the mobile device 102 changes. For instance, if step 510 fails due to lack of network connectivity or poor network connectivity for the mobile device 102 and network connectivity of the mobile device 102 subsequently improves and meets the threshold signal condition, the method then proceeds to 512.

Figure 6:
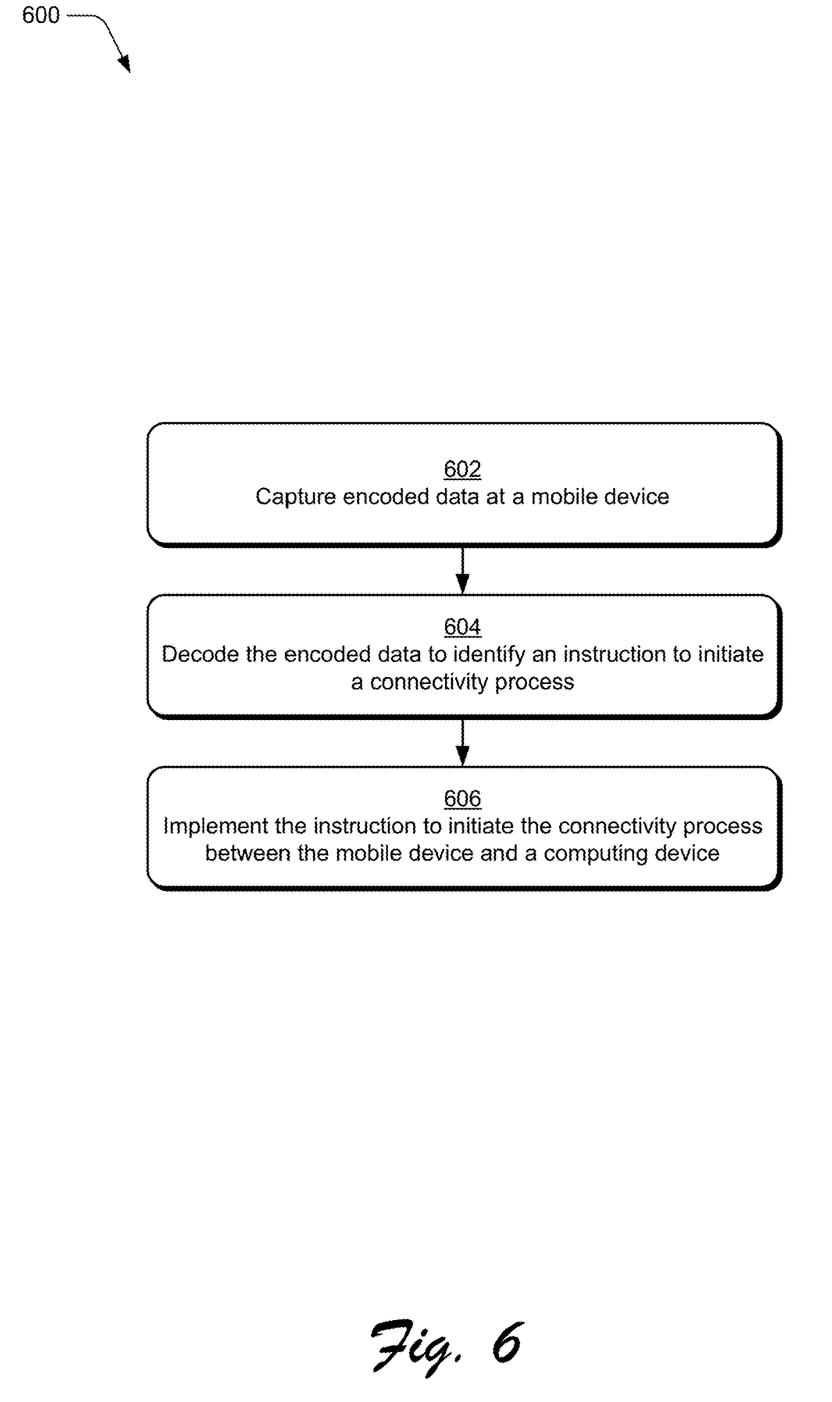
FIG. 6 illustrates an example method for utilizing encoded data as part of a connectivity process in accordance with one or more implementations.

FIG. 6 illustrates an example method 600 for utilizing encoded data as part of a connectivity process in accordance with one or more implementations. The method 600, for example, is implemented in conjunction with the method 500. At 602 encoded data is captured at a mobile device. The mobile device 102, captures encoded data generated and presented by the computing device 104, e.g., the visual indicator 302.

At 604 the encoded data is decoded to identify an instruction to initiate a connectivity process. The mobile device 102, for instance, decodes the encoded data to identify instructions and other data to be utilized for a connectivity process. Examples of other instructions included in the decoded data include instructions to initiate direct device-to-device connectivity (such as to initiate an interface session 204), instructions to determine a network status of the computing device 104, instructions to establish a connectivity session if the network status corresponds to a connectivity trigger, and so forth.

At 606 the instruction is implemented to initiate the connectivity process between the mobile device and a computing device. The connectivity interface module 134a and/or the connectivity interface module 134b, for instance, execute instructions from the decoded data to initiate a connectivity process 212. In at least one implementation, executing the instructions includes establishing an interface session 204.

Figure 7:
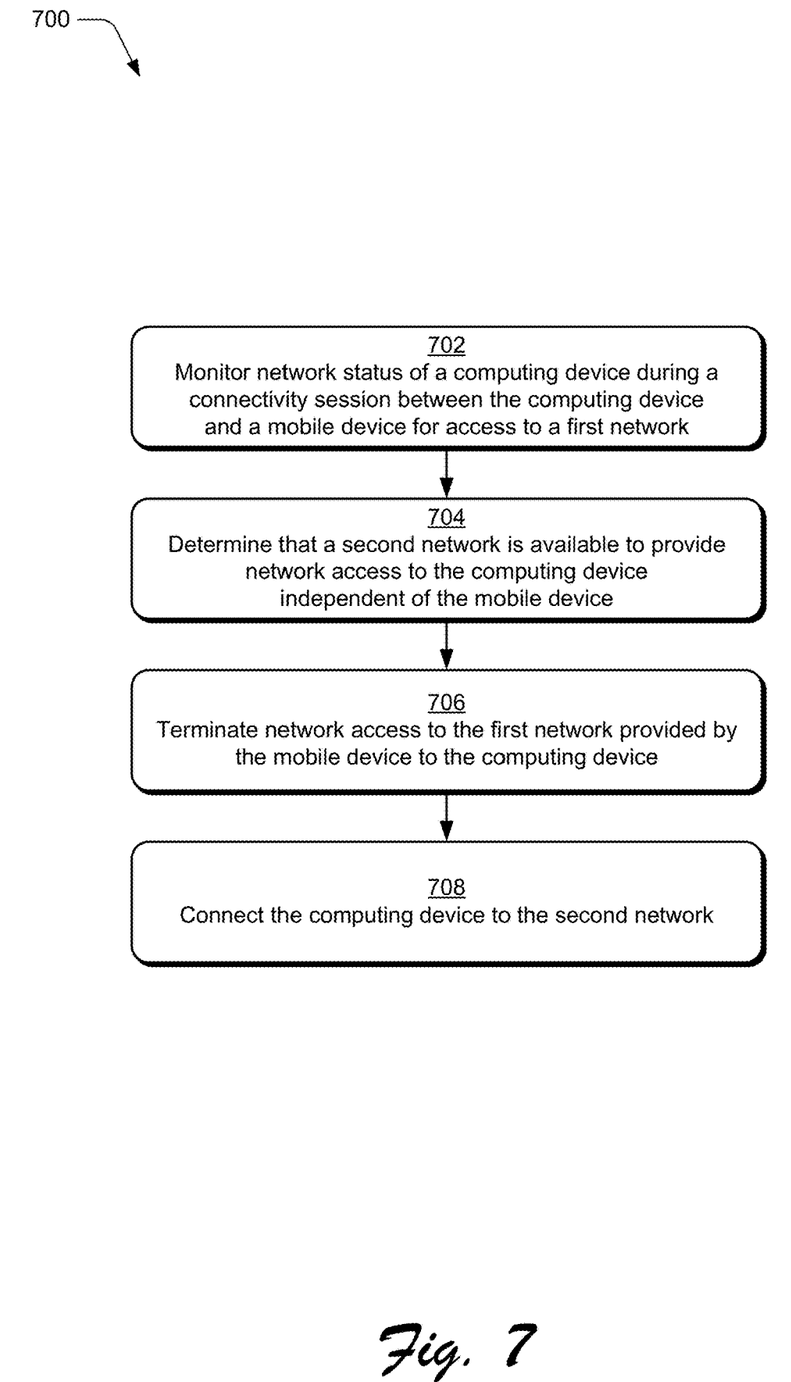
FIG. 7 illustrates an example method for terminating a connectivity session based on a change in network availability status in accordance with one or more implementations.

FIG. 7 illustrates an example method 700 for terminating a connectivity session based on a change in network availability status in accordance with one or more implementations. The method 700, for example, is implemented in conjunction with the method 500. At 702 network status of a computing device is monitored during a connectivity session between the computing device and a mobile device for access to a first network. For instance, after a connectivity session 218 is established between the computing device 104 and the mobile device 102, the connectivity interface module 134b monitors network status of the computing device 104. The connectivity session 218, for example, provides the computing device 104 with access to a first network via the mobile device 102. In at least one implementation, during a connectivity session with a particular network, the connectivity interface module 134b periodically queries the device connectivity module 122 to determine whether a different network is available to provide network connectivity to the computing device 104 independent of the mobile device 102, e.g., outside of the context of a connectivity session 218.

At 704 it is determined that a second network is available to provide network access to the computing device independent of the mobile device. The device connectivity module 122, for instance, detects that a different network is available to provide network connectivity to the computing device, e.g., a network that is different than a network involved in the connectivity session. In at least one implementation the device connectivity module 122 notifies the connectivity interface module 134b of the second, different available network. The device connectivity module 122 and/or the connectivity interface module 134b, for example, determine that network connectivity to the second network meets a threshold signal condition, e.g., a minimum signal strength and/or minimum signal quality.

At 706 network access to the first network provided by the mobile device to the computing device is terminated. The mobile device 102 and/or the computing device 104, for instance, disconnect a connectivity session 218. At 708 the computing device is connected to the second network. The device connectivity module 122, for instance, negotiates connectivity with the second network, such as for direct wireless and/or wired connectivity of the computing device 104 to the second network and independent of the mobile device 102.

Thus, the described techniques can be performed dynamically to provide network connectivity in a variety of different scenarios and network conditions.

The example methods described above may be performed in various ways, such as for implementing different aspects of the systems and scenarios described herein. Generally, any services, components, modules, methods, and/or operations described herein can be implemented using software, firmware, hardware (e.g., fixed logic circuitry), manual processing, or any combination thereof. Some operations of the example methods may be described in the general context of executable instructions stored on computer-readable storage memory that is local and/or remote to a computer processing system, and implementations can include software applications, programs, functions, and the like. Alternatively or in addition, any of the functionality described herein can be performed, at least in part, by one or more hardware logic components, such as, and without limitation, Field-programmable Gate Arrays (FPGAs), Application-specific Integrated Circuits (ASICs), Application-specific Standard Products (ASSPs), System-on-a-chip systems (SoCs), Complex Programmable Logic Devices (CPLDs), and the like. The order in which the methods are described is not intended to be construed as a limitation, and any number or combination of the described method operations can be performed in any order to perform a method, or an alternate method.

Figure 8:
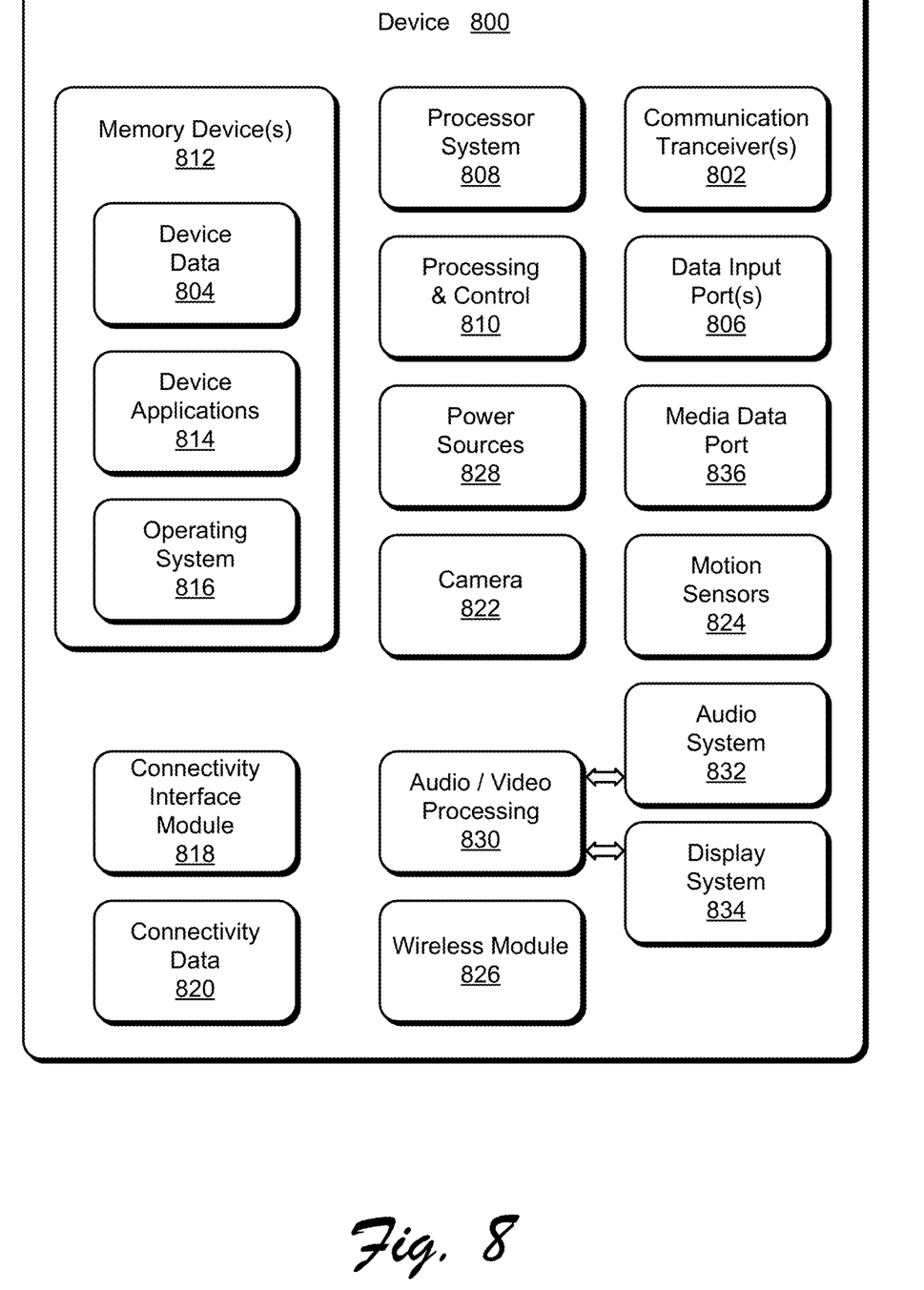
FIG. 8 illustrates various components of an example device that can implement aspects of connectivity session between devices based on a connectivity trigger.

FIG. 8 illustrates various components of an example device 800 in which aspects of connectivity session between devices based on a connectivity trigger can be implemented. The example device 800 can be implemented as any of the devices described with reference to the previous FIGS. 1-7, such as any type of mobile device, mobile phone, mobile device, wearable device, tablet, computing, communication, entertainment, gaming, media playback, and/or other type of electronic device. For example, the mobile device 102 and/or the computing device 104 as shown and described with reference to FIGS. 1-7 may be implemented as the example device 800. In a wearable device implementation, the device may include any one or combination of a watch, armband, wristband, bracelet, glove or pair of gloves, glasses, jewelry items, clothing items, any type of footwear or headwear, and/or other types of wearables.

The device 800 includes communication transceivers 802 that enable wired and/or wireless communication of device data 804 with other devices. The device data 804 can include any of device identifying data, device location data, wireless connectivity data, and wireless protocol data. Additionally, the device data 804 can include any type of audio, video, and/or image data. Example communication transceivers 802 include wireless personal area network (WPAN) radios compliant with various IEEE 802.15 (Bluetooth™) standards, wireless local area network (WLAN) radios compliant with any of the various IEEE 802.11 (Wi-Fi™) standards, wireless wide area network (WWAN) radios for cellular phone communication, wireless metropolitan area network (WMAN) radios compliant with various IEEE 802.16 (WiMAX™) standards, and wired local area network (LAN) Ethernet transceivers for network data communication.

The device 800 may also include one or more data input ports 806 via which any type of data, media content, and/or inputs can be received, such as user-selectable inputs to the device, messages, music, television content, recorded content, and any other type of audio, video, and/or image data received from any content and/or data source. The data input ports may include USB ports, coaxial cable ports, and other serial or parallel connectors (including internal connectors) for flash memory, DVDs, CDs, and the like. These data input ports may be used to couple the device to any type of components, peripherals, or accessories such as microphones and/or cameras.

The device 800 includes a processing system 808 of one or more processors (e.g., any of microprocessors, controllers, and the like) and/or a processor and memory system implemented as a system-on-chip (SoC) that processes computer-executable instructions. The processor system may be implemented at least partially in hardware, which can include components of an integrated circuit or on-chip system, an application-specific integrated circuit (ASIC), a field-programmable gate array (FPGA), a complex programmable logic device (CPLD), and other implementations in silicon and/or other hardware. Alternatively or in addition, the device can be implemented with any one or combination of software, hardware, firmware, or fixed logic circuitry that is implemented in connection with processing and control circuits, which are generally identified at 810. The device 800 may further include any type of a system bus or other data and command transfer system that couples the various components within the device. A system bus can include any one or combination of different bus structures and architectures, as well as control and data lines.

The device 800 also includes computer-readable storage memory 812 (e.g., memory devices) that enable data storage, such as data storage devices that can be accessed by a computing device, and that provide persistent storage of data and executable instructions (e.g., software applications, programs, functions, and the like). Examples of the computer-readable storage memory 812 include volatile memory and non-volatile memory, fixed and removable media devices, and any suitable memory device or electronic data storage that maintains data for computing device access. The computer-readable storage memory can include various implementations of random access memory (RAM), read-only memory (ROM), flash memory, and other types of storage media in various memory device configurations. The device 800 may also include a mass storage media device.

The computer-readable storage memory 812 provides data storage mechanisms to store the device data 804, other types of information and/or data, and various device applications 814 (e.g., software applications). For example, an operating system 816 can be maintained as software instructions with a memory device and executed by the processing system 808. The device applications may also include a device manager, such as any form of a control application, software application, signal-processing and control module, code that is native to a particular device, a hardware abstraction layer for a particular device, and so on. Computer-readable storage memory 812 represents media and/or devices that enable persistent and/or non-transitory storage of information in contrast to mere signal transmission, carrier waves, or signals per se. Computer-readable storage memory 812 do not include signals per se or transitory signals.

In this example, the device 800 includes a connectivity interface module 818 that implements aspects of connectivity session between devices based on a connectivity trigger and may be implemented with hardware components and/or in software as one of the device applications 814. An example, the connectivity interface module 818 can be implemented as the connectivity interface module 134a and/or the connectivity interface module 134b described in detail above. In implementations, the connectivity interface module 818 may include independent processing, memory, and logic components as a computing and/or electronic device integrated with the device 800. The device 800 also includes connectivity data 820 for implementing aspects of connectivity session between devices based on a connectivity trigger and may include data from the connectivity interface module 818.

In this example, the example device 800 also includes a camera 822 and motion sensors 824, such as may be implemented in an inertial measurement unit (IMU). The motion sensors 824 can be implemented with various sensors, such as a gyroscope, an accelerometer, and/or other types of motion sensors to sense motion of the device. The various motion sensors 824 may also be implemented as components of an inertial measurement unit in the device.

The device 800 also includes a wireless module 826, which is representative of functionality to perform various wireless communication tasks. For instance, for the mobile device 102 and/or the computing device 104, the wireless module 826 can be leveraged to scan for and detect wireless networks, as well as negotiate wireless connectivity to wireless networks for the mobile device 102 and/or the computing device 104. The device 800 can also include one or more power sources 828, such as when the device is implemented as a mobile device. The power sources 828 may include a charging and/or power system, and can be implemented as a flexible strip battery, a rechargeable battery, a charged super-capacitor, and/or any other type of active or passive power source.

The device 800 also includes an audio and/or video processing system 830 that generates audio data for an audio system 832 and/or generates display data for a display system 834. The audio system and/or the display system may include any devices that process, display, and/or otherwise render audio, video, display, and/or image data. Display data and audio signals can be communicated to an audio component and/or to a display component via an RF (radio frequency) link, S-video link, HDMI (high-definition multimedia interface), composite video link, component video link, DVI (digital video interface), analog audio connection, or other similar communication link, such as media data port 836. In implementations, the audio system and/or the display system are integrated components of the example device. Alternatively, the audio system and/or the display system are external, peripheral components to the example device.

Although implementations of connectivity session between devices based on a connectivity trigger have been described in language specific to features and/or methods, the subject of the appended claims is not necessarily limited to the specific features or methods described. Rather, the features and methods are disclosed as example implementations of connectivity session between devices based on a connectivity trigger, and other equivalent features and methods are intended to be within the scope of the appended claims. Further, various different examples are described and it is to be appreciated that each described example can be implemented independently or in connection with one or more other described examples. Additional aspects of the techniques, features, and/or methods discussed herein relate to one or more of the following:

A method, including: detecting that a connectivity trigger occurs indicating that a mobile device is to provide network connectivity for a computing device, the connectivity trigger being based at least in part on a network status of the computing device: initiating, in response to the connectivity trigger, a connectivity process to establish network connectivity for the computing device via the mobile device, the connectivity process including determining that a network status of the mobile device meets a threshold signal condition: and causing, automatically and in response to the connectivity process, network access to be provided to the computing device via the mobile device.

Alternatively or in addition to the above described method, any one or combination of the following: wherein the connectivity trigger includes an indication that the computing device does not have access to a network: wherein the connectivity trigger includes one or more of that a network that is available to the computing device is unstable or that a network that is available to the computing device is unsecure; wherein the connectivity trigger includes an indication that the computing device is in motion; wherein the connectivity trigger includes an indication that an application that utilizes network data is launched on the computing device: wherein said detecting the connectivity trigger occurs in conjunction with establishing direct device-to-device connectivity between the mobile device and the computing device: further including capturing encoded data presented on the computing device, and decoding the encoded data to identify an instruction to initiate the connectivity process, wherein said detecting that the connectivity trigger occurs is implemented based on implementing the instruction to initiate the connectivity process: wherein the threshold signal condition includes an indication that wireless connectivity of the mobile device to a network meets the threshold signal condition: wherein the connectivity process includes automatically exchanging authentication information between the mobile device and the computing device for the network access: further including displaying a notification that the connectivity process is initiated, and proceeding with the connectivity process in response to input to the notification.

A system including: one or more processors; and one or more computer-readable storage media storing instructions that are executable by the one or more processors to: cause direct device-to-device connectivity to be established between a computing device and a mobile device: determine, in response to the direct device-to-device connectivity, a network status of the computing device; determine, based on the network status of the computing device, that a connectivity session between the mobile device and the computing device is to be established to enable the mobile device to provide network connectivity to the computing device: initiate the connectivity process to establish network connectivity for the computing device via the mobile device; and cause, automatically and in response to the connectivity process, network access to be provided to the computing device via the mobile device.

Alternatively or in addition to the above described system, any one or combination of the following: wherein the instructions are further executable by the one or more processors to: capture a visual representation of encoded data presented on the computing device, and decode the encoded data to identify: a first instruction to cause the direct device-to-device connectivity between the computing device and the mobile device: a second instruction to determine the network status of the computing device; and a third instruction to establish the connectivity session in an event that the network status corresponds to a connectivity trigger indicating that the mobile device is to provide network connectivity for the computing device; execute one or more portions of the first instruction, the second instruction, and the third instruction to cause the direct device-to-device connectivity to be established between the computing device and the mobile device, to determine the network status of the computing device, and to initiate the connectivity process: wherein the network status indicates one or more of that the computing device does not have network access, that network access of the computing device is unstable, that network access of the computing device is unsecure, or that the computing device is detected to be in motion; wherein to initiate the connectivity process includes to share authentication information via the direct device-to-device connectivity for the network access between the mobile device and the computing device: wherein the instructions are further executable by the one or more processors to: capture a visual representation of encoded data presented on the computing device, and decode the encoded data to identify authentication information; and utilize at least a portion of the authentication information as part of the connectivity process to authenticate the computing device for the network access; wherein the instructions are further executable by the one or more processors to: determine whether network connectivity of the mobile device meets a threshold signal condition; and initiate the connectivity process in response to determining that the network connectivity of the mobile device meets the threshold signal condition; wherein the network access includes access of the computing device to a first network via the mobile device, and wherein the instructions are further executable by the one or more processors to: determine that a second network is available to provide network access to the computing device independent of the mobile device: and terminate the network access provided by the mobile device to the computing device.

A method, including: causing direct device-to-device connectivity to be established between a computing device and a mobile device: detecting, in response to the direct device-to-device connectivity, a connectivity trigger based at least in part on a network status of the computing device: determining, based on the connectivity trigger, that a connectivity session between the mobile device and the computing device is to be established to cause the mobile device to provide network connectivity to the computing device: and causing, automatically and in response to the connectivity trigger, the connectivity session to be initiated to provide network access to the computing device via the mobile device.

Alternatively or in addition to the above described method, any one or combination of the following: wherein the connectivity trigger includes one or more of that the computing device does not have network access, that network access of the computing device is unstable, that network access of the computing device is unsecure, or that the computing device is detected to be in motion; further including: initiating, in response to detecting the connectivity trigger, a connectivity process that includes determining a network status of the mobile device and sharing authentication information between the mobile device and the computing device; and causing the connectivity session to be initiated based on the connectivity process.

The invention claimed is:

1. A method, comprising:
    detecting that a connectivity trigger occurs indicating that a mobile device is to provide network connectivity for a computing device based at least in part on a network status of the computing device and whether the mobile device is located within a threshold proximity of the computing device, the connectivity trigger including launching an application on the mobile device;
    determining a threshold signal condition indicating a minimum signal strength for the application on the mobile device;
    initiating, in response to the connectivity trigger, a connectivity process to establish network connectivity for the computing device via the mobile device, the connectivity process including determining that a network status of the mobile device meets the threshold signal condition and that the mobile device is located within the threshold proximity of the computing device; and
    causing, automatically and in response to the connectivity process, network access to be provided to the computing device via the mobile device.

2. The method of claim 1, wherein the connectivity trigger comprises an indication that the computing device does not have access to a network.

3. The method of claim 1, wherein the connectivity trigger comprises one or more of that a network that is available to the computing device is unstable or that a network that is available to the computing device is unsecure.

4. The method of claim 1, wherein the connectivity trigger comprises an indication that the computing device is in motion.

5. The method of claim 1, wherein said detecting the connectivity trigger occurs in conjunction with establishing direct device-to-device connectivity between the mobile device and the computing device.

6. The method of claim 1, further comprising capturing encoded data presented on the computing device, and decoding the encoded data to identify an instruction to initiate the connectivity process, wherein said detecting that the connectivity trigger occurs is implemented based on implementing the instruction to initiate the connectivity process.

7. The method of claim 1, wherein the threshold signal condition comprises an indication that wireless connectivity of the mobile device to a network meets the threshold signal condition.

8. The method of claim 1, wherein the connectivity process comprises automatically exchanging authentication information between the mobile device and the computing device for the network access.

9. The method of claim 1, further comprising displaying a notification that the connectivity process is initiated, and proceeding with the connectivity process in response to input to the notification.

10. A system comprising:
    one or more processors; and
    one or more non-transitory computer-readable storage media storing instructions that are executable by the one or more processors to:
        detect that a connectivity trigger occurs indicating direct device-to-device connectivity to be established between a computing device and a mobile device based on whether the mobile device is located within a threshold proximity of the computing device, the connectivity trigger including launching an application on the mobile device;
        determine, in response to the direct device-to-device connectivity, a network status of the computing device and a threshold signal condition indicating a minimum signal strength for the application on the mobile device;
        determine, based on the network status of the computing device meeting the threshold signal condition, that a connectivity session between the mobile device and the computing device is to be established to enable the mobile device to provide network connectivity to the computing device;
        initiate a connectivity process to establish network connectivity for the computing device via the mobile device, the connectivity process including determining that the mobile device is located within the threshold proximity of the computing device; and
        cause, automatically and in response to the connectivity process, network access to be provided to the computing device via the mobile device.

11. The system of claim 10, wherein the instructions are further executable by the one or more processors to:
    capture a visual representation of encoded data presented on the computing device, and decode the encoded data to identify:
        a first instruction to cause the direct device-to-device connectivity between the computing device and the mobile device;
        a second instruction to determine the network status of the computing device; and
        a third instruction to establish the connectivity session in an event that the network status corresponds to a connectivity trigger indicating that the mobile device is to provide network connectivity for the computing device; and
    execute one or more portions of the first instruction, the second instruction, and the third instruction to cause the direct device-to-device connectivity to be established between the computing device and the mobile device, to determine the network status of the computing device, and to initiate the connectivity process.

12. The system of claim 10, wherein the network status indicates one or more of that the computing device does not have network access, that network access of the computing device is unstable, that network access of the computing device is unsecure, or that the computing device is detected to be in motion.

13. The system of claim 10, wherein to initiate the connectivity process comprises to share authentication information via the direct device-to-device connectivity for the network access between the mobile device and the computing device.

14. The system of claim 10, wherein the instructions are further executable by the one or more processors to:
    capture a visual representation of encoded data presented on the computing device, and decode the encoded data to identify authentication information; and
    utilize at least a portion of the authentication information as part of the connectivity process to authenticate the computing device for the network access.

15. The system of claim 10, wherein the instructions are further executable by the one or more processors to:
    determine whether network connectivity of the mobile device meets a threshold signal condition; and initiate the connectivity process in response to determining that the network connectivity of the mobile device meets the threshold signal condition.

16. The system of claim 10, wherein the network access comprises access of the computing device to a first network via the mobile device, and wherein the instructions are further executable by the one or more processors to:
determine that a second network is available to provide network access to the computing device independent of the mobile device; and
terminate the network access provided by the mobile device to the computing device.

17. A method, comprising:
causing direct device-to-device connectivity to be established between a computing device and a mobile device;
detecting, in response to the direct device-to-device connectivity, a connectivity trigger based at least in part on a network status of the computing device and whether the mobile device is located within a threshold proximity of the computing device, the connectivity trigger including launching an application on the mobile device;
determining a threshold signal condition indicating a minimum signal strength for the application on the mobile device;
determining, based on the connectivity trigger, that a connectivity session between the mobile device and the computing device is to be established to cause the mobile device to provide network connectivity to the computing device, the connectivity session including determining that a network status of the mobile device meets the threshold signal condition and that the mobile device is located within the threshold proximity of the computing device; and
causing, automatically and in response to the connectivity trigger, the connectivity session to be initiated to provide network access to the computing device via the mobile device.

18. The method of claim 17, wherein the connectivity trigger comprises one or more of that the computing device does not have network access, that network access of the computing device is unstable, that network access of the computing device is unsecure, or that the computing device is detected to be in motion.

19. The method of claim 17, further comprising:
initiating, in response to detecting the connectivity trigger, a connectivity process that includes determining a network status of the mobile device and sharing authentication information between the mobile device and the computing device; and
causing the connectivity session to be initiated based on the connectivity process.

20. The method of claim 1, further comprising displaying a notification that the network connectivity is not available, unstable, or unsecure based on the network status of the mobile device failing to meet the threshold signal condition.

\* \* \* \* \*